United States Patent
Patwardhan et al.

(10) Patent No.: US 9,350,672 B2
(45) Date of Patent: May 24, 2016

(54) PERFORMANCE ENHANCEMENT AND CONGESTION CONTROL OF MULTIPATH PROTOCOL PACKETS IN A HETEROGENEOUS NETWORK ENVIRONMENT WITH MULTIPATH TRANSPORT PROTOCOLS

(71) Applicant: CISCO TECHNOLOGY, INC., San Jose, CA (US)

(72) Inventors: Sourabh Suresh Patwardhan, San Jose, CA (US); Ajay A. Kulkarni, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 64 days.

(21) Appl. No.: 14/209,395

(22) Filed: Mar. 13, 2014

(65) Prior Publication Data

US 2015/0263959 A1 Sep. 17, 2015

(51) Int. Cl.
*H04L 12/801* (2013.01)
*H04L 12/823* (2013.01)
*H04L 12/26* (2006.01)

(52) U.S. Cl.
CPC .......... *H04L 47/193* (2013.01); *H04L 43/0858* (2013.01); *H04L 47/32* (2013.01)

(58) Field of Classification Search
None
See application file for complete search history.

(56) References Cited

U.S. PATENT DOCUMENTS 6,535,482 B1 * 3/2003 Hadi Salim et al. .......... 370/229
8,400,923 B2   3/2013 Kini
2007/0206621 A1 * 9/2007 Plamondon et al. .......... 370/413
2011/0296006 A1 * 12/2011 Krishnaswamy et al. .... 709/224
2012/0093150 A1 * 4/2012 Kini .............................. 370/389
2013/0077501 A1 * 3/2013 Krishnaswamy et al. .... 370/252
2013/0086142 A1 * 4/2013 Hampel et al. ................ 709/203
2013/0182573 A1   7/2013 Soppera et al.

OTHER PUBLICATIONS

Cao, et al., "Delay-based Congestion Control for Multipath TCP," Proceedings of the 2012 20th IEEE International Conference on Network Protocols (ICNP), Oct. 30, 2012, Austin, TX, 10 pages.

Han, et al., "Multi-Path TCP: A Joint Congestion Control and Routing Scheme to Exploit Path Diversity in the Internet," IEEE/ACM Transactions on Networking, vol. 14, Issue 6, Dec. 19, 2006; 12 pages.

Khalili, et al., "Non-Pareto Optimality of MPTCP: Performance Issues and a Possible Solution," Proceedings, 8th International Conference on emerging Networking Experiments and Technologies (CoNEXT), Dec. 10, 2012, Nice, France; 18 pages.

(Continued)

*Primary Examiner* — Mark Rinehart
*Assistant Examiner* — Angel Brockman
(74) *Attorney, Agent, or Firm* — Patent Capital Group

(57) ABSTRACT

An example method for performance enhancement in a heterogeneous network environment with multipath transport protocols is provided and includes receiving packets according to Transmission Control Protocol (TCP packets) and packets according to multipath TCP (MPTCP packets) in a network environment, determining that TCP packets are experiencing congestion in comparison to the MPTCP packets, and delaying acknowledgement packets (MPTCP ACK packets) corresponding to the MPTCP packets for a predetermined time interval. In a specific embodiment, a local MPTCP proxy intercepts the TCP packets and forwards underlying data of the TCP packets according to MPTCP.

20 Claims, 4 Drawing Sheets

(56) References Cited

OTHER PUBLICATIONS

Raiciu, et al., "Coupled Congestion Control for Multipath Transport Protocols," IETF RFC 6356, Oct. 2011, 12 pages.

Wischik, et al., "Design, implementation and evaluation of congestion control for multipath TCP," Proceedings of the 8th USENIX conference on Networked Systems Design and Implementation, Boston, MA, Mar. 30, 2011, Boston, MA; 14 pages.

* cited by examiner

US 9,350,672 B2

PERFORMANCE ENHANCEMENT AND CONGESTION CONTROL OF MULTIPATH PROTOCOL PACKETS IN A HETEROGENEOUS NETWORK ENVIRONMENT WITH MULTIPATH TRANSPORT PROTOCOLS

TECHNICAL FIELD

This disclosure relates in general to the field of communications and, more particularly, to performance enhancement in a heterogeneous network environment with multipath transport protocols.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for performance enhancement in a heterogeneous network environment with multipath transport protocols is provided and receiving packets according to Transmission Control Protocol (TCP packets) and packets according to multipath TCP (MPTCP packets) in a network environment, determining that TCP packets are experiencing congestion in comparison to the MPTCP packets, and delaying acknowledgement packets (MPTCP ACK packets) corresponding to the MPTCP packets for a pre-determined time interval. In a specific embodiment, a local MPTCP proxy intercepts the TCP packets and forwards underlying data of the TCP packets according to MPTCP.

Example Embodiments

Figure 1:
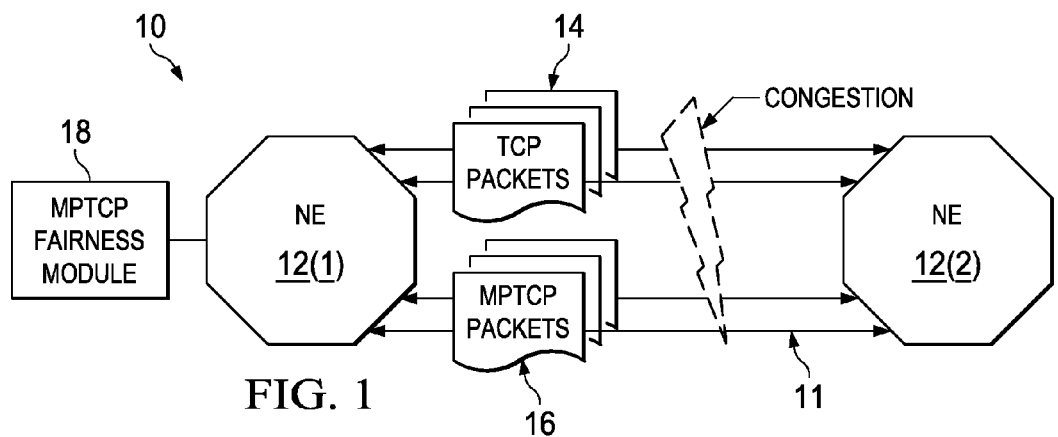
FIG. 1 is a simplified block diagram illustrating a communication system for performance enhancement in a heterogeneous network environment with multipath transport protocols.

Turning to FIG. 1, FIG. 1 is a simplified block diagram illustrating a communication system 10 for performance enhancement in a heterogeneous network environment with multipath transport protocols in accordance with one example embodiment. FIG. 1 illustrates a network 11 comprising a plurality of network elements (e.g., 12(1), 12(2)) communicating transmission control protocol (TCP) packets 14 and multipath TCP (MPTCP) packets 16. In various embodiments, network 11 may include a mix of legacy TCP applications and relatively modern MPTCP endpoints. At least a portion of network elements (e.g., 12(1)) in network 11 may include a MPTCP fairness module 18 configured to resolve a negative impact of MPTCP flows on traditional TCP endpoints through active congestion control to achieve fairness for TCP packets 14 with MPTCP packets 16.

As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. In various embodiments, MPTCP fairness module 18 may comprise an application executing in network elements (e.g., 12(1)) in network 11. Substantially all routers, switches and other such network elements in network 11 that may be exposed to both TCP packets 14 and MPTCP packets 16 may be provisioned with MPCTP fairness module 18.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

MPTCP comprises a protocol that enables simultaneous use of several Internet Protocol (IP) addresses and interfaces by a modification of regular TCP, wherein a regular TCP interface is presented to applications while in fact spreading data across several sub-flows. Benefits of using MPTCP include better resource utilization, better throughput and smoother reaction to failures. When an application opens a new TCP socket in a multipath-enabled networking stack, the underlying stack discovers the number of multiple paths available to reach the destination peer, and opens as many sub-flows as its internal heuristic dictates, up to the maximum number of known paths. The data produced by the client and the server can be sent over any of the sub-flows that compose a MPTCP connection, and if a sub-flow fails, data may need to be retransmitted over another sub-flow.

Each MPTCP sub-flow is equivalent to a normal TCP connection with its own 32-bits sequence numbering space. MPTCP maintains a 64-bits data sequence numbering space. When a host sends a TCP segment over one sub-flow, it indicates inside the segment, by using a Data Sequence Signal (DSS) option, a mapping between the 64-bits data sequence number and the 32-bits sequence number used by the sub-flow. In Multipath TCP, a received segment is acknowledged at two different levels. First, the TCP cumulative or selective acknowledgements are used to acknowledge the reception of the segments on each sub-flow. Second, a connection-level acknowledgement is returned by the receiving host to provide cumulative acknowledgements at the data sequence level. The same DSS option is used to inform the peer about the connection level sequence number and the connection-level acknowledgement. When a segment is lost, the receiver detects the gap in the received 32-bits sequence number and traditional TCP retransmission mechanisms are triggered to recover from the loss. When a sub-flow fails, MPTCP detects the failure and retransmits the unacknowledged data over another sub-flow that is still active.

In certain datacenter deployments, several legacy applications or services rely on basic TCP connections to communicate with each other. Recent advances in datacenter networks allow for a two-tier (e.g., spine and leaf architecture, flat-tree, B-cube, etc.) to be deployed, allowing fixed-latency multi-path connectivity between any two nodes (e.g., servers) in the datacenter. Traditional TCP is designed only for single path connectivity and cannot take advantage of the multiple paths present in such datacenter networks, potentially limiting the performance for TCP connections within the datacenter.

New protocols like MPTCP and concurrent multipath stream control TCP (SCTCP) are being designed to be used in such data centers. Future data centers may comprise a heterogeneous hybrid system where some end points may rely in legacy TCP connections and other end points may rely on MPTCP (and other multipath) connections. In such network architecture, nodes may preferentially use MPTCP connections, degrading performance of the legacy TCP connections. Further, because MPTCP flows are non-pareto optimal, upgrading certain traditional TCP users to MPTCP can reduce throughput of others endpoint without any benefit to the upgraded endpoints.

Multipath TCP cannot use the standard TCP control scheme without being unfair to normal TCP flows. Consider two hosts sharing a single bottleneck link. If both hosts use regular TCP and open one TCP connection, they would achieve almost the same throughput. However, if one host opens several sub-flows for a single MPTCP connection that all pass through the bottleneck link, the MPTCP sub-flows, in combination, may use more than its fair share of the link.

A coupled congestion control scheme may be used with such hybrid flows that combine MPTCP and regular TCP. The standard TCP congestion control increases and decreases the congestion window and slow-start threshold upon reception of acknowledgements and detection of losses. The coupled congestion control scheme also relies on a congestion window that follows a slightly different scheme than regular TCP. The size of the window increases are capped at the increase value that would be applied by a regular TCP flow, ensuring that MPTCP flows do not take more of the available bandwidth compared to regular TCP flows, on any of its sub-flows. In addition, aggressiveness of MPTCP flows can be controlled suitably using an aggressiveness parameter of the congestion window. An optimum value of the aggressiveness parameter may be calculated based on a constraint that any combination of paths cannot take more capacity than a regular TCP flow using the best of those paths. However, when a substantial number of MPTCP flows traverse a bottleneck link compared to a few regular TCP flows, congestion control schemes may not achieve optimum fairness. In particular, the MPTCP congestion control schemes may not even kick in to impose fairness for the few TCP flows traversing the link.

Communication system 10 is configured address these issues (among others) to offer a system and method for performance enhancement in a heterogeneous network environment with multipath transport protocols. In various embodiments, network element 12(1) may receive TCP packets 14, and MPTCP packets 16 in network 11. MPTCP fairness module 18 at network element 12(1) may determine that TCP packets 14 are experiencing more congestion in comparison to MPTCP packets 16. MPTCP fairness module 18 may delay acknowledgement packets (MPTCP ACK packets) corresponding to MPTCP packets 16 for a pre-determined time interval.

According to various embodiments, network element 12(1) may keep track of substantially all MPTCP flows traversing through it. After every few milliseconds (say T), MPTCP fairness module 18 may compute a vector $\{n_1, n_2, n_3, n_4 \ldots n_k\}$ for substantially all (e.g., K) TCP flows flowing through it. Each vector element ($n_i$) represents an amount of explicit congestion notification (ECN) bits set in corresponding TCP packets 14. (When congestion is detected, an ECN-aware network element may set a mark (ECN bit) in the packet's IP header to signal impending congestion. The receiver of the packet echoes the congestion indication to the sender, which reduces its transmission rate as though it detected a dropped packet.)

Assume, merely as an example, and not as a limitation, that three TCP flows flow through network element 12(1). Every T milliseconds, MPTCP fairness module 18 may generate the ECN vector, say $\{10, 20, 30\}$, indicating that flow 1 had 10 ECN bits set during the time period, flow 2 had 20 ECN bits set, and flow 3 had 30 ECN bits set. MPTCP fairness module 18 may compare the ECN vector calculated in the current time period to ECN vector calculated in a sequentially previous time period. If the trend of set ECN bits is monotonically increasing, the trend may indicate congestion for TCP packets. In other words, a net positive difference between the current ECN vector and the previous ECN vector may indicate increasing congestion for TCP packets 14. If $V1=\{n1, n2 \ldots nk\}$ and $V2\{n1, n2, \ldots nk\}$ are the two ECN vectors computed in time period T1 and the next subsequent time period T2, the congestion trend indicates congestion if: $V2\{n1\}-V1\{n1\}+V2\{n2\}-V1\{n2\}+\ldots V2\{nk\}-V1\{nk\}$ is a net positive value.

MPTCP fairness module 18 may also track MPTCP flows. A lack of net decrease in the MPTCP flows combined with increasing congestion for TCP packets 14 can indicate that TCP packets 14 are experiencing more congestion in comparison to MPTCP packets 16 (e.g., MPTCP traffic is aggressively degrading performance of the TCP flows). MPTCP fairness module 18 may conclude that there is a strong likelihood of MPTCP traffic affecting normal TCP behavior, and may force an MPTCP flow adjustment, for example, triggering MPTCP flow control mechanisms suitably.

In various embodiments, on a best-effort basis, MPTCP fairness module 18 may introduce a delay for MPTCP acknowledgement (ACK) packets flowing through it. By delaying the MPTCP ACK packets of the MPTCP flows, a round trip time (RTT) values of the corresponding MPTCP flows may be increased. In some embodiments, the delay may be achieved by buffering the MPTCP ACK packets in a local buffer, which may be configured to be cleared after a predetermined time interval (e.g., after every N milliseconds, where N is based on an exponential back-off type algorithm; if the overall congestion does not change much, the value of N may be increased after a few observations of the vectors subject to a maximum value.) Over time, MPTCP packets 16 may experience more delays for their ACK packets, triggering MPTCP's flow control mechanisms (e.g., coupled congestion control, etc.). The MPTCP flow control mechanisms may facilitate clearing buffers downstream to restore traditional TCP performance to previous levels. Thus, the MPTCP flow control mechanisms may be triggered when the MPTCP ACK packets are delayed beyond a predetermined threshold period (e.g., N milliseconds). Network element 12(1) may terminate the MPTCP flow adjustment if the TCP performance improves, or does not persistently improve after a certain threshold time period.

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network. The example network environment of home network 17 may be configured over a physical infrastructure that may include WLANs (including BLUETOOTH) and wired LANs.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Figure 2:
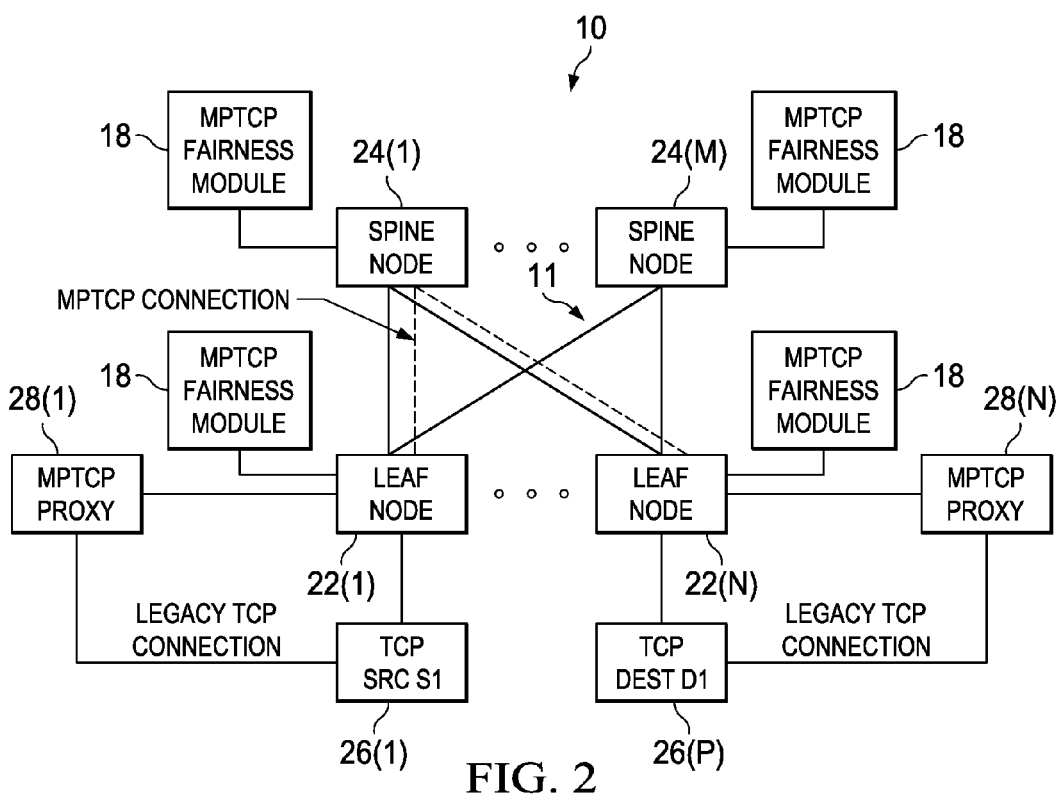
FIG. 2 is a simplified block diagram illustrating another embodiment of the communication system.

Turning to FIG. 2, FIG. 2 is a simplified block diagram illustrating example details of another embodiment of communication system 10. FIG. 2 illustrates a network 11 including a plurality leaf nodes 22(1)-22(N), and another plurality of spine nodes 24(1)-24(M) connected in a two-tier (e.g., spine-leaf) network architecture that uses multipath transport protocols, such as MPTCP. A plurality of end points 26(1)-26(P) may be connected to leaf nodes 22(1)-22(N) appropriately. In many embodiments, at least some of end points 26(1)-26(P), for example, end points 26(1) and 26(P), may use legacy non-multi path transport protocols, such as TCP, and may not support MPTCP and other such multi-path transport protocols. Each node in network 11 may be provisioned with MPTCP fairness module 18.

In various embodiments, each leaf node 22(1)-22(N) that is connected to a legacy TCP endpoint (e.g., 26(1), 26(P)) may use an MPTCP proxy (e.g., 28(1), 28(N)) for performance enhancement in network 11. MPTCP proxies 28(1)-28(N) used on first-hop nodes 22(1)-22(N) in network 11 can allow performance improvements without upgrading the legacy applications on endpoints 26(1), 26(P) to use MPTCP implementations. MPTCP proxies 28(1)-28(N) can use available multiple paths in network 11 without involving legacy TCP endpoints 26(1)-26(P). In specific embodiments, MPTCP proxies 28(1)-28(N) may snoop TCP connection establishment and tear down packets.

Assume, merely as an example, and not as a limitation, that legacy TCP endpoint 26(1) sends out a TCP connection request directed to remote legacy TCP endpoint 26(P). Local MPTCP proxy 28(1) may intercept the request and establish a TCP connection with local endpoint 26(1). Local MPTCP proxy 28(1) may initiate an MPTCP connection with remote endpoint 26(P). Remote MPTCP proxy 28(N) may intercept the MPTCP connection request, and establish the MPTCP connection with local MPTCP proxy 28(1). Remote MPTCP proxy 28(N) may establish another TCP connection with endpoint 26(P). MPTCP proxy 28(1) may intercept TCP packets from local endpoint 26(1), buffer the TCP packets in a local buffer, and transmit TCP acknowledgement packets (TCP ACK packets) corresponding to the TCP packets to local endpoint 26(1). MPTCP proxy 28(1) may transmit the underlying data of the TCP packets according to MPTCP to remote endpoint 26(P).

Remote MPTCP proxy 28(N) may intercept the MPTCP packets from MPTCP proxy 28(1) and transmit MPTCP acknowledgement packets (MPTCP ACK packets) corresponding to the MPTCP packets to MPTCP proxy 28(1). In some embodiments, MPTCP proxy 28(1) may wait for the MPTCP ACK packet from MPTCP proxy 28(N) before sending the TCP ACK packet to endpoint 26(1). Remote MPTCP proxy 28(N) may transmit the underlying data of the MPTCP packets according to TCP to endpoint 26(P). The same sequence may be repeated at tear down.

In various embodiments, a round trip time (RTT) value is observed and recorded on the MPTCP connection established by MPTCP proxy 28(1). The TCP ACK packets to local endpoint 26(1) may be delayed proportionally to the RTT value. For example, the ACK delay may equal a maximum of observed RTT value and a random value between 1 and $RTT_{max}$. Thus, if the MPTCP connection is experiencing congestion, the TCP packets from endpoint 26(1) may be proportionally delayed to accommodate the congestion. Thus, if congestion is observed in the MPTCP connection part of network 11, the congestion information may be propagated back to the original TCP source (e.g., endpoint 26(1)) thereby achieving flow control.

In various embodiments, an error may occur at any one of 3 points in the above example endpoint 26(1) to MPTCP proxy 28(1); MPTCP proxy 28(1) to MPTCP proxy 28(N); and MPTCP proxy 28(N) to endpoint 26(P). The first and last hops (endpoints 26(1), 26(P), respectively) are traditional TCP connections and may use the TCP's mechanisms for retransmission and flow control. The middle connection between MPTCP proxy 28(1) and MPTCP proxy 28(N) may utilize MPTCP's flow control and retransmission mechanisms.

In some embodiments, MTPCP proxies 28(1)-28(N) can allow a service provider in a multi-tenant datacenter to offer differentiated levels of service to the datacenter tenants. For example, MTPCP proxies 28(1)-28(N) may not be active for substantially all TCP flows in network 11. Based on certain operator specified constraints (e.g., configurable through suitable command line interface (CLI)), certain TCP flows may be accelerated using MPTCP connections. The TCP flows to be accelerated may be identified by various parameters (e.g., N-tuple) such as segment/tenant identifier (ID), level of service (e.g., according to a service level agreement (SLA)), IP address, TCP port numbers, etc. MTPCP proxies 28(1)-28(N) can allow selective performance enhancement of certain tenant TCP flows in network 11, facilitating offering differentiated quality of service (QoS) for TCP flows using the underlying mechanism of MPTCP proxies 28(1)-28(N).

In various embodiments, MPTCP proxies 28(1)-28(N) may comprise applications executing in first-hop switches (e.g., leaf nodes 12(1)-12(N)) in network 11. In other embodiments, MPTCP proxies 28(1)-28(N) may execute in other network elements connected to first-hop switches (e.g., leaf nodes 12(1)-12(N)) in network 11 through suitable wired or wireless connections.

Figure 3:
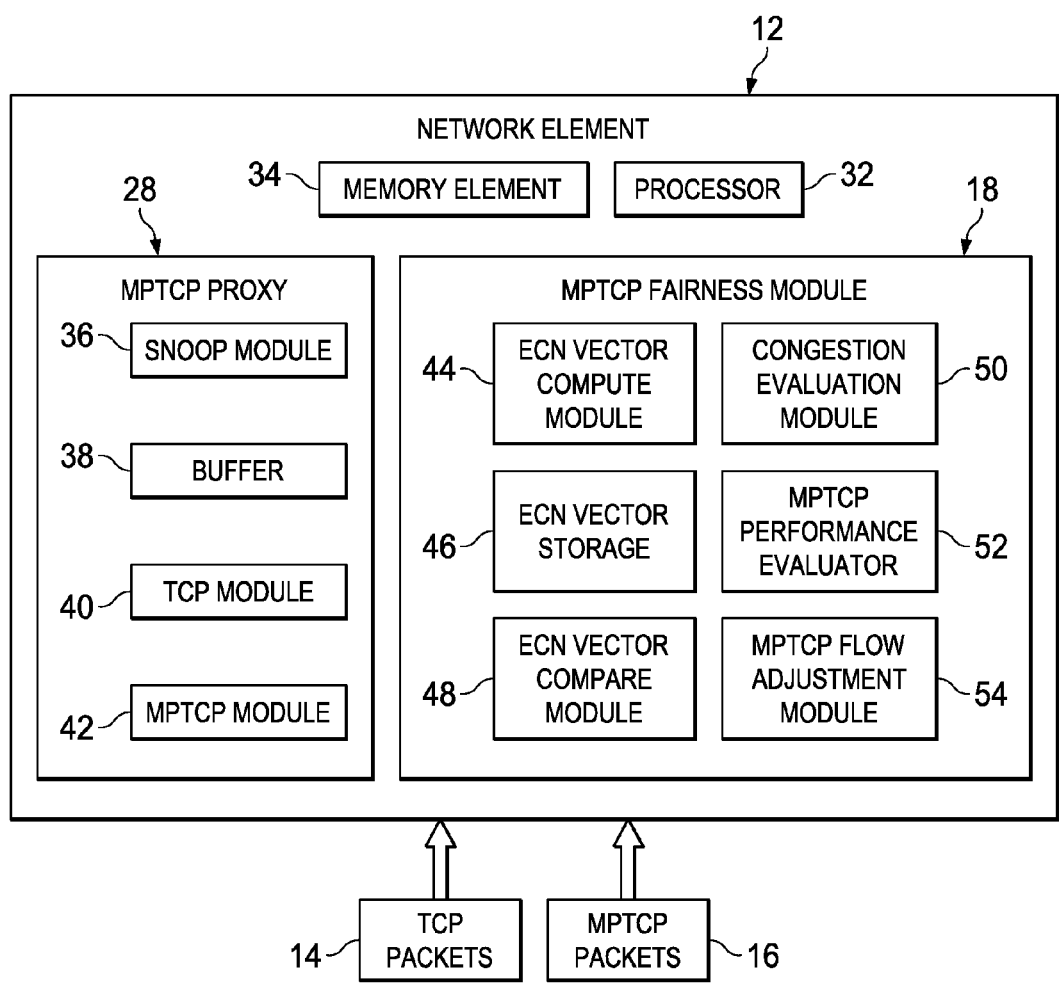
FIG. 3 is a simplified block diagram illustrating yet another embodiment of the communication system.

Turning to FIG. 3, FIG. 3 is a simplified block diagram illustrating example details of an embodiment of communication system 10. Example network element 12 may include a processor 32 and a memory element 34, in addition to MPTCP fairness module 18 and MPTCP proxy 28. MPTCP proxy 28 may include a snoop module 36, a buffer 38 (which may comprise a portion of memory element 34), a TCP module 40 and an MPTCP module 42. MPTCP fairness module 18 may include an ECN vector compute module 44, an ECN vector storage 46 (which may comprise a portion of memory element 34), an ECN vector compare module 48, a congestion evaluation module 50, an MPTCP performance evaluator 52, and an MPTCP flow adjustment module 54.

During operation, snoop module 36 may snoop MPTCP and TCP connection establishment/tear-down packets, for example, in MPTCP packets 16 and TCP packets 14, respectively. Any TCP connection establishment request packet may trigger TCP module 40, which may intercept the TCP connection establishment request packet and establish a TCP connection with the sender of the TCP connection establishment request packet. MPTCP module 42 may initiate and establish an MPTCP connection with the remote destination endpoint (or a MPTCP proxy thereat). TCP packets from the TCP sender may be buffered in buffer 38 appropriately.

Any MPTCP connection establishment request packet may trigger an investigation of whether the destination is a legacy TCP endpoint. In such scenarios, MPTCP module 42 may be triggered, which may establish the MPTCP connection. TCP module 40 may establish a TCP connection with the destination endpoint. MPTCP packets 16 may be converted to TCP packets 14 and forwarded to the destination endpoint.

In scenarios wherein TCP packets 14 and MPTCP packets 16 may traverse the network simultaneously, MPTCP fairness module 18 may facilitate fairness between the TCP and MPTCP flows. ECN vector compute module 44 may compute the ECN vector for TCP flows, the ECN vector comprising the number of ECN bits set for each TCP flow traversing network element 12 within a predetermined time period. The computed ECN vector may be compared by ECN vector compare module 48 with a previously computed ECN vector, which may be stored in ECN vector storage 46.

Congestion evaluation module 50 may determine, based on the comparison, whether TCP flows are experiencing congestion. MPTCP performance evaluator 52 may determine whether there is a lack of net decrease in MPTCP flows through network element 12. If there is a lack of net decrease on MPTCP flows and TCP flows are experiencing congestion, MPTCP flow adjustment module 54 may be triggered. MPTCP ACK packets may be delayed appropriately, until the TCP congestion is eased, or a preconfigured time interval has elapsed.

Figure 4:
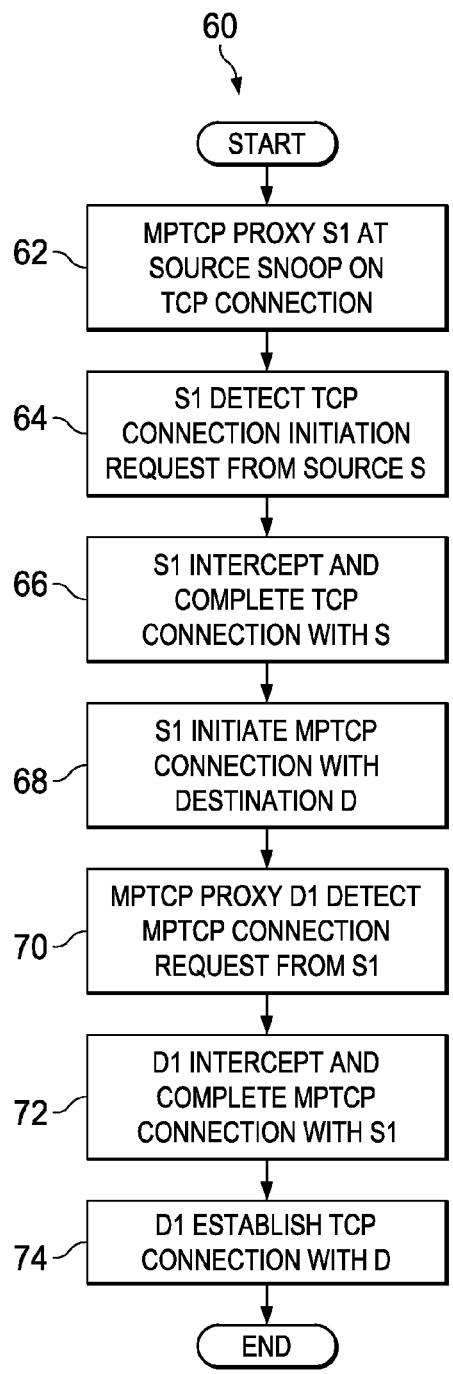
FIG. 4 is a simplified flow diagram illustrating example operations that may be associated with an embodiment of the communication system.

Turning to FIG. 4, FIG. 4 is a simplified flow diagram illustrating example operations 60 that may be associated with embodiments of communication system 10. At 62, MPTCP proxy S1 (e.g., 28(1)) may snoop on TCP connection establishment/tear down packets. At 64, MPTCP proxy S1 28(1) may detect a TCP connection initiation request from source S (e.g., endpoint 26(1)). At 66, MPTCP proxy S1 28(1) may intercept and complete the TCP connection with source S (e.g., endpoint 26(1)). At 68, MPTCP proxy S1 28(1) may initiate a MPTCP connection with destination D (e.g., endpoint 26(P)). At 70, MPTCP proxy D1 28(N) may detect the MPTCP connection request from MPTCP proxy S1 28(1). At 72, MPTCP proxy D1 28(N) may intercept and complete the MPTCP connection with MPTCP proxy S1 28(1). At 74, MPTCP proxy D1 28(N) may establish another TCP connection with destination D (e.g., endpoint 26(P)).

Figure 5:
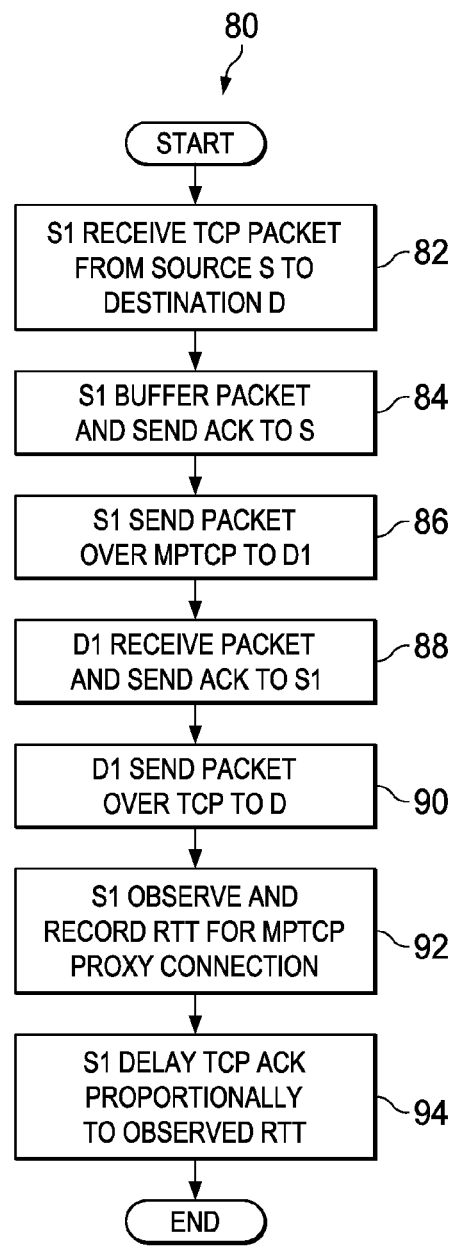
FIG. 5 is a simplified flow diagram illustrating other example operations that may be associated with an embodiment of the communication system.

Turning to FIG. 5, FIG. 5 is a simplified flow diagram illustrating example operations 80 that may be associated with embodiments of communication system 10. At 82, MPTCP proxy S1 28(1) may receive a TCP packet (e.g., 14) from source S (e.g., endpoint 26(1)). At 84, MPTCP proxy S1 28(1) may buffer TCP packet 14 and a TCP ACK message to source S (e.g., endpoint 26(1)). At 86, MPTCP proxy S1 28(1) may send underlying data in TCP packet 14 in MPTCP packet 16 to MPTCP proxy D1 28(N). At 88, MPTCP proxy D1 28(N) may receive MPCTP packet 16, and may send a MPTCP ACK message back to MPTCP proxy S1 28(1). At 90, MPTCP proxy D1 28(N) may send underlying data in MPTCP packet 16 over TCP to destination D (e.g., endpoint 26(P)). At 92, MPTCP proxy S1 28(1) may observe and record RTT for MPTCP proxy connection with MPTCP proxy D1 28(N). At 94, MPTCP proxy S1 28(1) may delay TCP ACK messages to source S (e.g., endpoint 26(1)) proportionally to the observed RTT.

Figures 6, 7:
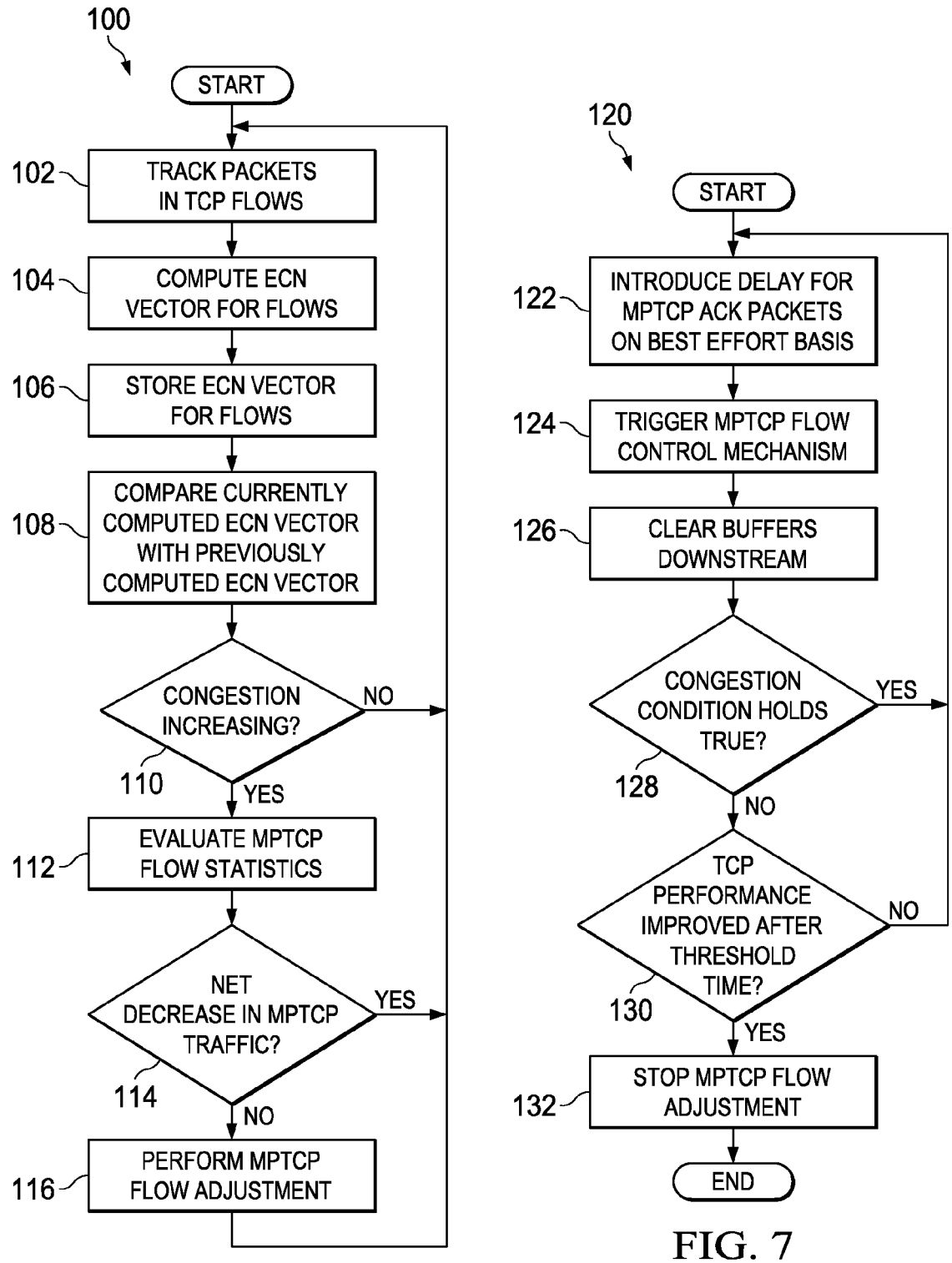
FIG. 6 is a simplified flow diagram illustrating yet other example operations that may be associated with an embodiment of the communication system.
FIG. 7 is a simplified flow diagram illustrating yet other example operations that may be associated with an embodiment of the communication system.

Turning to FIG. 6, FIG. 6 is a simplified flow diagram illustrating example operations 100 that may be associated with embodiments of communication system 10. At 102, MPTCP fairness module 18 may track packets in TCP flows (e.g., TCP packets 14). At 104, ECN vector compute module 44 may compute the ECN vector for the TCP flows. At 106, the computed ECN vector may be stored (e.g., in ECN vector storage 46). At 108, ECN vector compare module 48 may compare currently computed ECN vector with a previously computed ECN vector (accessed from ECN vector storage 46). At 110, a determination may be made whether the congestion experienced by TCP packets 14 is increasing. A net positive value between the currently computed ECN vector and the previously computed ECN vector may indicate increasing congestion. If not, the operations may revert back to 102. If congestion is increasing for TCP packets 14, at 112, MPTCP performance evaluator 52 may evaluate MPTCP flow statistics (including MPTCP flow (e.g., flow volume, flow duration, etc.). At 114, a determination may be made whether the MPTCP traffic is experiencing a net decrease. If MPTCP traffic is experiencing a net decrease (e.g., indicating congestion is not due to TCP traffic being congested out by MPTCP traffic), the operations may revert to 102. If MPTCP traffic is not experiencing a net decrease, at 116, MPTCP flow adjustment may be performed to delay MPTCP packets 16 appropriately to ease congestion for TCP packets 14. Subsequently, the operations may revert back to 102, when congestion has eased, or a predetermined time interval has elapsed.

Turning to FIG. 7, FIG. 7 is a simplified flow diagram illustrating example operations 120 that may be associated with embodiments of communication system 10. At 122, MPTCP fairness module 18 may introduce a delay for MPTCP ACK packets on a best-effort basis. At 124, MPTCP flow control mechanisms may be triggered. At 126, buffers downstream may be cleared due to the MPTCP flow control mechanisms. At 128, a determination may be made whether congestion condition (e.g., TCP congestion increasing with no net decrease in MPTCP flow) holds true. If yes, the operations may revert to 122. If the congestion condition does not hold true, at 130, a determination may be made whether the TCP performance has improved (e.g., TCP packets not experiencing congestion) after a predetermined threshold time. If not, the operations may revert to 122. If the TCP performance has improved after the predetermined threshold time, the MPTCP flow adjustment may be stopped at 132.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, network element 12. In some embodiments, one or more of these features may be implemented in hardware, provided external to these elements, or consolidated in any appropriate manner to achieve the intended functionality. The various network elements (e.g., service node 14) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, MPTCP fairness module 18 and MPTCP proxy 28 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 34) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 32) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving packets according to Transmission Control Protocol (TCP packets), and packets according to multipath TCP (MPTCP packets) in a network environment, the TCP and MPTCP comprising different network protocols;
    determining that TCP packets are experiencing more congestion in comparison to the MPTCP packets, based on explicit congestion notification (ECN) vectors; and
    delaying acknowledgement packets (MPTCP ACK packets) corresponding to the MPTCP packets for a pre-determined time interval, thereby increasing a round trip time (RTT) for the MPTCP packets while decreasing congestion experienced by the TCP packets.

2. The method of claim 1, wherein the ECN vectors comprise a first ECN vector and a second ECN vector, wherein determining that TCP packets are experiencing congestion based on the ECN vectors comprises:
    generating the first ECN vector including a first number of ECN bits set for each flow of TCP packets during a first time interval;
    generating the second ECN vector including a second number of ECN bits set for each flow of the TCP packets during a subsequent second time interval;
    comparing the second ECN vector with the first ECN vector, wherein a net positive difference between the second ECN vector and the first ECN vector indicates increasing congestion for the TCP packets; and
    tracking flow of the MPTCP packets (MPTCP flows), wherein a lack of net decrease in the MPTCP flows combined with increasing congestion for the TCP packets indicates that the TCP packets are experiencing more congestion in comparison to the MPTCP packets.

3. The method of claim 1, wherein the delaying the MPTCP ACK packets comprises buffering the MPTCP ACK packets in a local buffer.

4. The method of claim 1, further comprising triggering MPCTP flow control mechanisms.

5. The method of claim 1, wherein if the TCP packets do not stop experiencing congestion after the pre-determined time interval, the MPTCP ACK packets are not further delayed.

6. The method of claim 1, wherein if the TCP packets stop experiencing congestion during the pre-determined time interval, the MPTCP ACK packets are not further delayed.

7. The method of claim 1, wherein a local MPTCP proxy intercepts the TCP packets and forwards underlying data of the TCP packets according to MPTCP.

8. The method of claim 7, wherein the local MPTCP proxy snoops a connection with a local endpoint, wherein the method further comprises:
    intercepting a request from the local endpoint for a TCP connection with a remote endpoint in the network;
    establishing a TCP connection with the local endpoint;
    initiating an MPTCP connection with the remote endpoint;
    buffering the TCP packets from the local endpoint in a local buffer;
    transmitting TCP acknowledgement packets (TCP ACK packets) corresponding to the TCP packets to the local endpoint; and
    transmitting the underlying data according to MPTCP to the remote endpoint.

9. The method of claim 8, wherein a remote MPTCP proxy connected to the remote endpoint intercepts an MPTCP connection request from the local MPTCP proxy and establishes the MPTCP connection, wherein the remote MPTCP proxy establishes another TCP connection with the remote endpoint, wherein the remote MPTCP proxy intercepts the MPTCP packets from the local MPTCP proxy and forwards the underlying data to the remote endpoint according to TCP.

10. The method of claim 8, wherein a round trip time (RTT) value is observed and recorded on the MPTCP connection established by the local MPTCP proxy, wherein the TCP ACK packets are delayed proportionally to the RTT value.

11. Non-transitory tangible media that includes instructions for execution, which when executed by a processor, is operable to perform operations comprising:
    receiving TCP packets and MPTCP packets in a network environment;
    determining that TCP packets are experiencing more congestion in comparison to the MPTCP packets, the TCP and MPTCP comprising different network protocols, based on ECN vectors; and
    delaying MPTCP ACK packets corresponding to the MPTCP packets for a pre-determined time interval, thereby increasing a round trip time (RTT) for the MPTCP packets while decreasing congestion experienced by the TCP packets.

12. The media of claim 11, wherein the ECN vectors comprise a first ECN vector and a second ECN vector, wherein determining that TCP packets are experiencing congestion based on the ECN vectors comprises:
    generating the first ECN vector including a first number of ECN bits set for each flow of TCP packets during a first time interval;

generating the second ECN vector including a second number of ECN bits set for each flow of the TCP packets during a subsequent second time interval;

comparing the second ECN vector with the first ECN vector, wherein a net positive difference between the second ECN vector and the first ECN vector indicates increasing congestion for TCP packets; and tracking MPTCP flow, wherein a lack of net decrease in the MPTCP flow combined with increasing congestion for TCP packets indicates that TCP packets are experiencing congestion in comparison to MPTCP packets.

13. The media of claim 11, wherein a local MPTCP proxy intercepts the TCP packets and forwards underlying data of the TCP packets according to MPTCP.

14. The media of claim 13, wherein the local MPTCP proxy snoops a connection with a local endpoint, wherein the method further comprises:

intercepting a request from the local endpoint for a TCP connection with a remote endpoint in the network;

establishing a TCP connection with the local endpoint;

initiating an MPTCP connection with the remote endpoint;

buffering the TCP packets from the local endpoint in a local buffer;

transmitting TCP ACK packets corresponding to the TCP packets to the local endpoint; and transmitting the underlying data according to MPTCP to the remote endpoint.

15. The media of claim 14, wherein a remote MPTCP proxy connected to the remote endpoint intercepts an MPTCP connection request from the local MPTCP proxy and establishes the MPTCP connection, wherein the remote MPTCP proxy establishes another TCP connection with the remote endpoint, wherein the remote MPTCP proxy intercepts the MPTCP packets from the local MPTCP proxy and forwards the underlying data to the remote endpoint according to TCP.

16. An apparatus, comprising:

a memory element for storing data; and a processor, wherein the processor executes instructions associated with the data, wherein the processor and the memory element cooperate, such that the apparatus is configured for:

receiving TCP packets and MPTCP packets in a network environment, the TCP and MPTCP comprising different network protocols;

determining that TCP packets are experiencing more congestion in comparison to the MPTCP packets, based on ECN vectors; and delaying MPTCP ACK packets corresponding to the MPTCP packets for a pre-determined time interval, thereby increasing a round trip time (RTT) for the MPTCP packets while decreasing congestion experienced by the TCP packets.

17. The apparatus of claim 16, wherein the ECN vectors comprise a first ECN vector and a second ECN vector, wherein determining that TCP packets are experiencing congestion based on the ECN vectors comprises:

generating the first ECN vector including a first number of ECN bits set for each flow of TCP packets during a first time interval;

generating the second ECN vector including a second number of ECN bits set for each flow of the TCP packets during a subsequent second time interval;

comparing the second ECN vector with the first ECN vector, wherein a net positive difference between the second ECN vector and the first ECN vector indicates increasing congestion for TCP packets; and tracking MPTCP flow, wherein a lack of net decrease in the MPTCP flow combined with increasing congestion for TCP packets indicates that TCP packets are experiencing congestion in comparison to MPTCP packets.

18. The apparatus of claim 16, wherein the apparatus includes a local MPTCP proxy, wherein the local MPTCP proxy intercepts the TCP packets and forwards underlying data of the TCP packets according to MPTCP.

19. The apparatus of claim 18, wherein the local MPTCP proxy snoops a connection with a local endpoint connected to the apparatus, wherein the method further comprises:

intercepting a request from the local endpoint for a TCP connection with a remote endpoint in the network;

establishing a TCP connection with the local endpoint;

initiating an MPTCP connection with the remote endpoint;

buffering the TCP packets from the local endpoint in a local buffer in the memory element;

transmitting TCP ACK packets corresponding to the TCP packets to the local endpoint; and transmitting the underlying data according to MPTCP to the remote endpoint.

20. The apparatus of claim 19, wherein a remote MPTCP proxy connected to the remote endpoint intercepts an MPTCP connection request from the local MPTCP proxy and establishes the MPTCP connection, wherein the remote MPTCP proxy establishes another TCP connection with the remote endpoint, wherein the remote MPTCP proxy intercepts the MPTCP packets from the local MPTCP proxy and forwards the underlying data to the remote endpoint according to TCP.

* * * * *